United States Patent
Fukui et al.

(10) Patent No.: US 7,312,450 B2
(45) Date of Patent: Dec. 25, 2007

(54) INFRARED DETECTING DEVICE

(75) Inventors: Suguru Fukui, Shijonawate (JP); Teruki Hatatani, Sanda (JP); Yuji Takada, Kyoto (JP); Atsushi Hironaka, Shijonawate (JP)

(73) Assignee: Matsushita Electric Works, Ltd., Osaka (JP)

( * ) Notice: Subject to any disclaimer, the term of this patent is extended or adjusted under 35 U.S.C. 154(b) by 132 days.

(21) Appl. No.: 10/536,980

(22) PCT Filed: Nov. 11, 2004

(86) PCT No.: PCT/JP2004/017129

§ 371 (c)(1),
(2), (4) Date: May 31, 2005

(87) PCT Pub. No.: WO2005/047835

PCT Pub. Date: May 26, 2005

(65) Prior Publication Data

US 2005/0285040 A1 Dec. 29, 2005

(30) Foreign Application Priority Data

Nov. 14, 2003 (JP) ............................. 2003-385974

(51) Int. Cl.
*G01J 5/00* (2006.01)
(52) U.S. Cl. ................. 250/338.3; 250/338.1
(58) Field of Classification Search ............. 250/338.3; 348/165
See application file for complete search history.

(56) References Cited

U.S. PATENT DOCUMENTS 5,654,550 A * 8/1997 Nomura et al. .......... 250/338.3
5,917,187 A * 6/1999 Takada et al. ............ 250/338.3
6,081,558 A * 6/2000 North ...................... 375/316
6,677,589 B2 * 1/2004 Hironaka et al. ......... 250/338.3
6,730,909 B2 * 5/2004 Butler ..................... 250/338.1
2002/0074499 A1 * 6/2002 Butler ..................... 250/338.1
2003/0047671 A1 * 3/2003 Hironaka et al. ............ 250/221

FOREIGN PATENT DOCUMENTS

| EP | 1 291 629 A2 | 3/2003 |
| JP | 11-083624 A1 | 3/1999 |
| JP | 2002-156281 A1 | 5/2002 |

OTHER PUBLICATIONS

PCT International Search Report for PCT/JP2004/017129.

* cited by examiner

*Primary Examiner*—David Porta
*Assistant Examiner*—Mark R Gaworecki
(74) *Attorney, Agent, or Firm*—Cheng Law Group PLLC

(57) ABSTRACT

An infrared detecting device for reducing current consumption while maintaining performance is disclosed. The device includes a drive power supply circuit which comprises a current generating circuit and a distribution circuit, and which supplies a drive current to each of signal circuits comprising an I/V conversion circuit, a voltage amplification circuit, a detection circuit and an output circuit. The current generating circuit includes a reference current source, a fixed current source providing a fixed current based on the reference current and a variable current source providing a variable current stepped up or down to any different currents based on the reference current. The distribution circuit distributes the drive current to a part of the signal circuits based on the current from the fixed current source and distributes the drive current to a remaining part of the signal circuits based on the current from the variable current source.

16 Claims, 14 Drawing Sheets

INFRARED DETECTING DEVICE

TECHNICAL FIELD

The invention relates to an infrared detecting device.

BACKGROUND ART

Infrared detecting devices are specially used in different electrical products which efficiently save energy while detecting a human body.

A prior art device described Japanese Patent Publication No. 11-83624 is comprised of a pyroelectric element, an I/V conversion circuit, a voltage amplification circuit, a detection circuit and an output circuit. The pyroelectric element is operable to generate a micro current signal in response to variation of incoming infrared radiation from detection area through condenser lens or the like. The I/V conversion circuit converts the current signal from the pyroelectric element into a voltage signal. The voltage amplification circuit selectively amplifies components with prescribed frequencies of the voltage signal to issue a components-amplified voltage. The detection circuit is comprised of, for example, a window comparator and provides a comparison between the components-amplified voltage and a prescribed detection threshold voltage to issue a detection signal of the infrared radiation. The detection threshold voltage is a window threshold with a higher threshold voltage and a lower threshold voltage. The output circuit is comprised of, for example, level shift circuit or the like and issues an output signal in response to the detection signal. This infrared detecting device issues the output signal for representing detection of the infrared radiation (e.g., human body) when the components-amplified voltage is less or more than the window threshold range. The device also issues the output signal for representing non-detection of the infrared radiation when the components-amplified voltage is converged within the window threshold range.

A prior art device described Japanese Patent Publication No. 2002-156281 comprises a battery as a power source in addition to the pyroelectric element, the I/V conversion circuit, the voltage amplification circuit, the detection circuit and the output circuit. This infrared detecting device provides a rated current as a drive current to I/V conversion circuit, the voltage amplification circuit, the detection circuit and the output circuit when voltage of the I/V conversion circuit exceeds a prescribed voltage. When the voltage of the I/V conversion circuit is equal to or lower than the prescribed voltage, the device provides a smaller current than the rated current as the drive current to those circuits. In this case, current consumption (drive current) can be reduced.

However, in the construction that reduces current consumption as the device does, there is a problem that the performance or behavior of the circuits become unstable. Because the circuits will easily suffer dispersion of parts-performance such as threshold of transistors, resistance and capacitance, or dispersion of current consumption caused by temperature characteristics. There is also a trend that indicates greater dispersion of the current consumption in case the drive current to the circuits is much reduced to the level such as, for example, 10 s nA below a few μA. Considering these issues, since there is a need of design with sufficient allowance for power voltage, temperature characteristics, dispersion of parts-performance or the like in order to provide infrared detecting devices with low consumption, it is difficult to sufficiently save energy of the device.

DISCLOSURE OF THE INVENTION

An object of the present invention is to reduce current consumption while keeping the performance or behavior of the circuits in stable state.

An infrared detecting device of the present invention comprises a pyroelectric element, an I/V conversion circuit, a voltage amplification circuit, a detection circuit, an output circuit and a drive power supply circuit. The pyroelectric element generates a current signal based on incoming infrared radiation. The I/V conversion circuit converts the current signal into a voltage signal. The voltage amplification circuit selectively amplifies components with prescribed frequencies (prescribed frequencies components) of the voltage signal to issue a components-amplified voltage. The detection circuit provides a comparison between the components-amplified voltage and a prescribed detection threshold voltage to issue a detection signal of the infrared radiation. The output circuit issues an output signal based on the detection signal. The drive power supply circuit supplies a drive current to each of signal circuits comprised of the I/V conversion circuit, the voltage amplification circuit, the detection circuit and the output circuit. As characteristic of this invention, the drive power supply circuit is comprised of a current generating circuit and a distribution circuit. The current generating circuit includes a reference current source, a fixed current source and a variable current source. The reference current source generates a reference current. The fixed current source provides a fixed current based on the reference current. The variable current source provides a variable current varying with the reference current. The distribution circuit distributes the drive current to a part of the signal circuits based on the current from the fixed current source. The distribution circuit also distributes the drive current to the remaining part of the signal circuits based on the current from the variable current source.

By distributing the drive current to the part of the signal circuits based-on the current from the fixed current source, influence of current changeover in the part can be excluded and therefore the performance or behavior of the part can be kept in stable state. By distributing the drive current to the remaining part based on the current from the variable current source, current consumption of the remaining part can be reduced.

The drive power supply circuit may comprise a plural of the variable current source, each of which is individually connected to each circuit of the remaining part of the signal circuits. In this case, since the drive current to each of the remaining part can be individually changed, the drive current can be preferably reduced to low level.

The drive power supply circuit may comprise a terminal for receiving a changeover signal. The variable current source may step the variable current up or down to any of prescribed different currents in accordance with the changeover signal received at the terminal. Since drive current can be changed over in accordance with the changeover signal, current consumption can be adaptively reduced.

The variable current source may step the variable current up or down to any of prescribed different currents based on variation of power voltage. In this case, the drive current can be preferably reduced based on the variation of the power voltage.

The variable current source may step the variable current up or down to any of prescribed different currents based on variation in ambient temperature. In this case, the drive current can be preferably reduced based on the variation in ambient temperature.

The voltage amplification circuit may comprise a differential stage and an output stage. The distribution circuit may distribute the drive current to the differential stage or the output stage based on the current from said variable current source, or distribute same or different current as the drive current to the differential stage and the output stage based on the current from said variable current source.

The infrared detecting device may further comprise a suppression circuit and the drive power supply circuit may comprise a current changeover circuit. This current changeover circuit provides a first changeover signal to the variable current source when the components-amplified voltage is closer to a reference level than a transition threshold voltage. This transition threshold voltage is set to be closer to the reference level than the detection threshold voltage. The current changeover circuit also provides a second changeover signal to the variable current source when the components-amplified voltage is further from the reference level than the transition threshold voltage. The variable current source steps the variable current down to a current smaller than a rated current of prescribed different currents based on the first changeover signal. The variable current source also steps the variable current up to the rated current based on the second changeover signal. The suppression circuit starts suppression of output of any circuit or circuits included in the signal circuits in order to suppress the output signal of the output circuit. The suppression is started from a start point in time on or before which the variable current source steps up or down the variable current. The suppression circuit also releases the suppression after a prescribed time period. In this case, it becomes possible to prevent false operation due to variation when the drive current is changed over.

The suppression circuit may comprise a resistor, a constant voltage supply circuit, a switch and a switch controlling circuit. The resistor is connected in series between the voltage amplification circuit and the detection circuit. The constant voltage supply circuit supplies a constant voltage between the resistor and the detection circuit through the switch. The switch is connected between the constant voltage supply circuit and a pathway from the resistor to the detection circuit. The switch also opens or closes a pathway from the constant voltage supply circuit to the resistor and the detection circuit in response to OFF or ON signal from the switch controlling circuit respectively. The switch controlling circuit provides the ON signal to the switch from the start point. The switch controlling circuit also provides the OFF signal to the switch after the time period.

The voltage amplification circuit may comprise an operational amplifier and a feedback resistor, and the suppression circuit may comprise a switch and a switch controlling circuit. The operational amplifier has a positive input terminal, a negative input terminal and an output terminal. The feedback resistor is connected between the output terminal and one of the input terminals. The switch is connected in parallel with the feedback resistor. The switch also opens or closes its parallel pathway in response to OFF or ON signal from the switch controlling circuit respectively. The switch controlling circuit provides the ON signal to the switch from the start point. The switch controlling circuit also provides the OFF signal to the switch after the time period. Since output of the voltage amplification circuit is suppressed at 1× input voltage of the voltage amplification circuit during the time period, it becomes possible to prevent false operation due to variation when the drive current is changed over.

The suppression circuit may comprise a resistor, a switch, a constant voltage supply circuit and a switch controlling circuit. The switch is connected between the voltage amplification circuit and the detection circuit. The switch also opens or closes a pathway from the voltage amplification circuit to the detection circuit in response to OFF or ON signal from the switch controlling circuit respectively. The constant voltage supply circuit supplies a constant voltage between the switch and the detection circuit through the resistor. The switch controlling circuit provides the OFF signal to the switch from the start point. The switch controlling circuit also provides the ON signal to the switch after the time period. Since the pathway is opened during the time period, it becomes possible to prevent false operation due to variation when the drive current is changed over.

The suppression circuit may comprise a constant voltage supply circuit, a switch and a switch controlling circuit. The constant voltage supply circuit supplies a constant voltage to the detection circuit through the switch. The switch exists at a junction connecting the constant voltage supply circuit, the voltage amplification circuit, and the detection circuit. The switch also closes or opens a pathway (hereinafter referred to as a "first pathway") between the constant voltage supply circuit and the detection circuit in response to suppression or unsuppression signal from the switch controlling circuit respectively. The switch also opens or closes a pathway (hereinafter referred to as a "second pathway") between the voltage amplification circuit and the detection circuit in response to the suppression or the unsuppression signal respectively. The switch controlling circuit provides the suppression signal to the switch from the start point. The switch also provides the unsuppression signal to the switch after the time period. Since the first and the second pathways are closed and opened during the time period, it becomes possible to prevent false operation due to variation when the drive current is changed over.

The suppression circuit may comprise a switch and a switch controlling circuit. The switch is connected between the detection circuit and the output circuit. The switch also opens or closes a pathway between the detection circuit and the output circuit in response to OFF or ON signal from the switch controlling circuit respectively. The switch controlling circuit provides the OFF signal to the switch from the start point. The switch controlling circuit also provides the ON signal to the switch after the time period. Since the pathway is opened during the time period, it becomes possible to prevent false operation due to variation when the drive current is changed over.

The switch controlling circuit may issue the second changeover signal so that the variable current source increases the variable current to the biggest rated current while stepping up from smallest current of the different currents according to the second changeover signal. The switch controlling circuit may also issue the first changeover signal so that the variable current source decreases the variable current to the smallest current while stepping down from the rated current of the different currents according to the first changeover signal. Since the variable current is increased or decreased by sequential step up or down (i.e. discrete up or down) operation which can reduce variation it becomes possible to preferably prevent false operation due to variation when the drive current is changed over.

BRIEF DESCRIPTION OF THE DRAWINGS

Preferred embodiments of the invention will now be described in further details. Other features and advantages of the present invention will become better understood with regard to the following detailed description and accompanying drawings where.

BEST MODE FOR CARRYING OUT THE INVENTION

Figure 1:
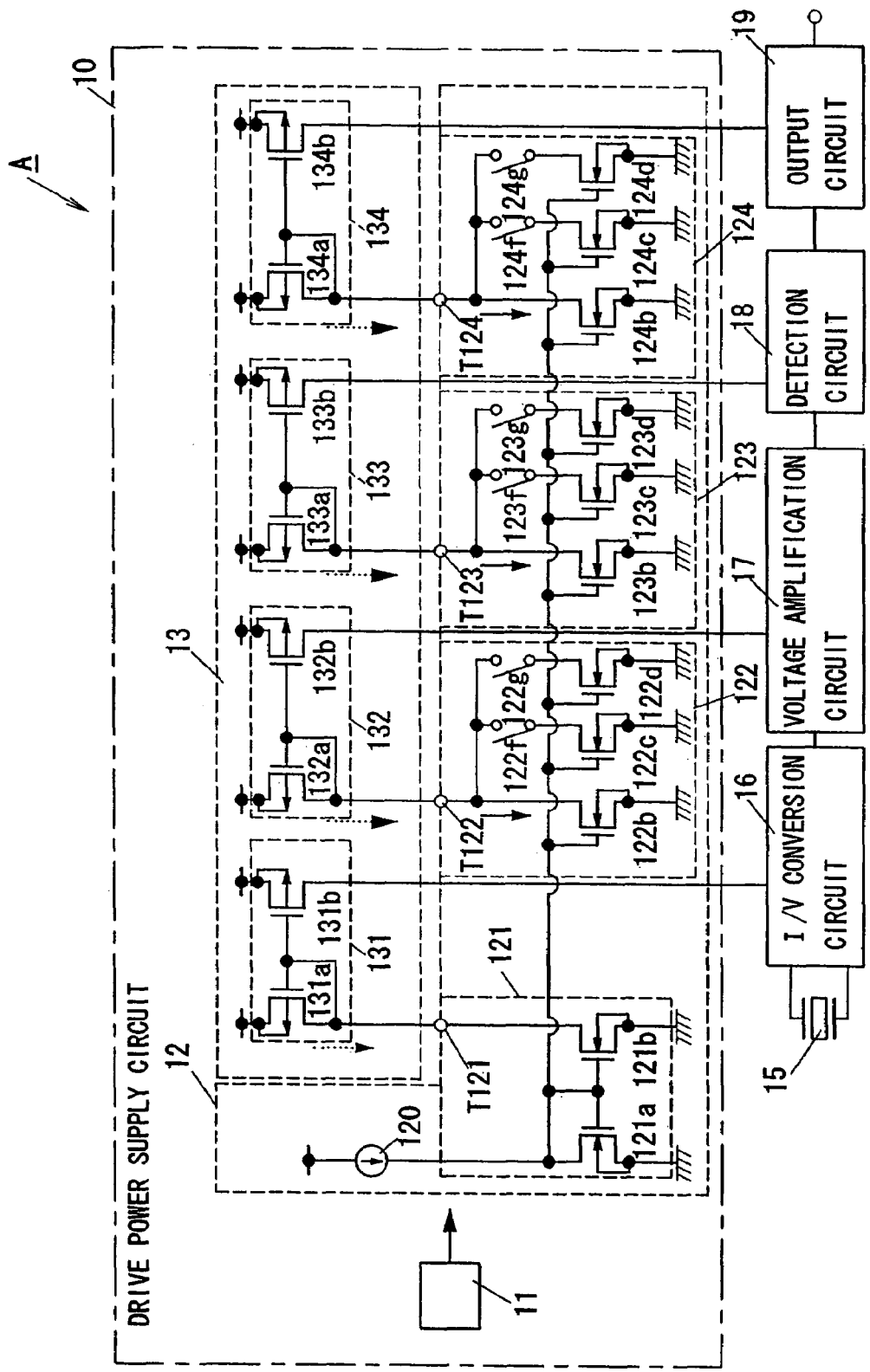
FIG. 1 is an electrical diagram of an infrared detecting device of a first embodiment according to the present invention.

FIG. 1 shows an infrared detecting device A of a first embodiment according to the present invention.

The device A comprises a drive power supply circuit 10 as a characteristic of the embodiment in addition to comprising a pyroelectric element 15, an I/V conversion circuit 16, a voltage amplification circuit 17, a detection circuit 18 and an output circuit 19 in the same way as the prior art devices.

By the way, the above-mentioned prior art device has a limitation in reduction of current consumption of circuits 16-19 in order to secure a certain additional coverage for the ability of current supply. This point is explained in detail with reference to FIGS. 2 and 3.

Figure 2:
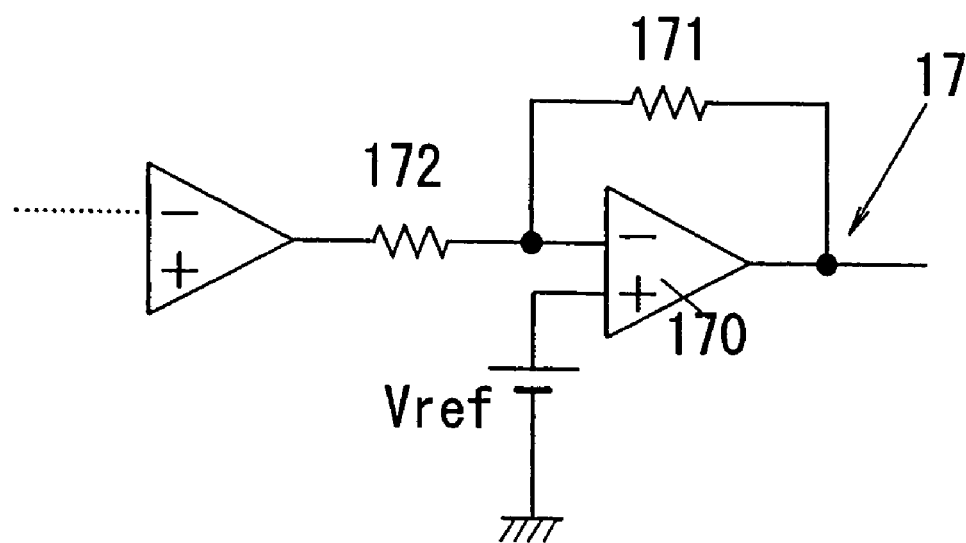
FIG. 2 is an electrical diagram of a voltage amplification circuit in the arrangement of FIG. 1.

The voltage amplification circuit 17 as shown in FIG. 2 comprises an operational amplifier 170 and resistors 171 and 172. The amplifier 170 has a positive input terminal, a negative input terminal and an output terminal. A reference voltage Vref is applied to the positive input terminal. The resistor (feedback resistor) 171 is connected between the negative input terminal and the output terminal. The resistor 172 is connected between the I/V conversion circuit 16 and the negative input terminal of the amplifier 170.

Figure 3:
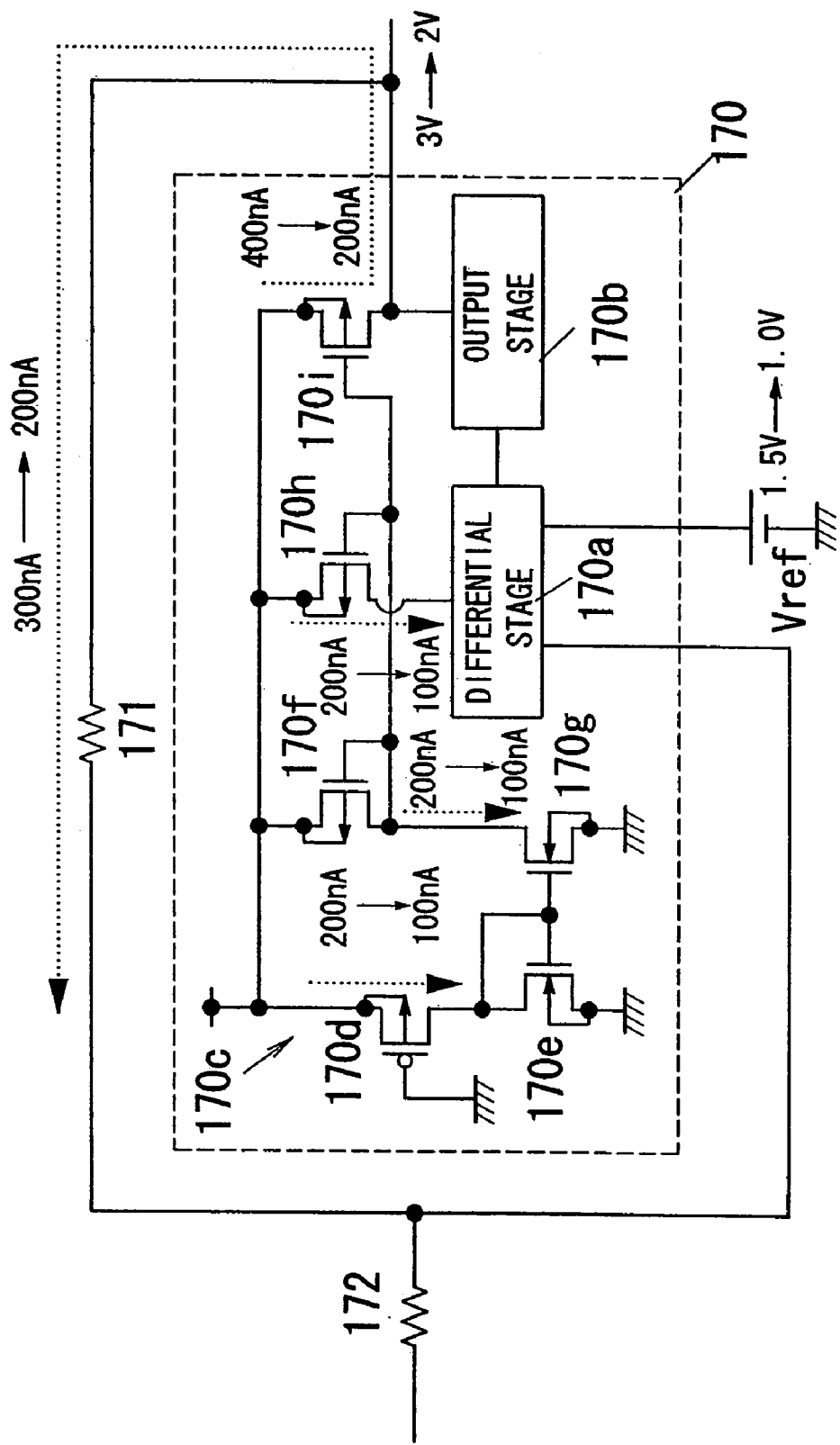
FIG. 3 is an electrical diagram of an operational amplifier in the arrangement of FIG. 2.

The amplifier 170 as shown in FIG. 3 is constructed with a differential stage 170a, an output stage 170b and a constant current stage 170c. This stage 170c comprises transistors 170d-170i which construct mirror circuits. The stage 170c also provides power to the differential stage 170a and output stage 170b. The transistor 170d is a PMOS depletion type of transistor. Each of the transistors 170f, 170h and 170i is a PMOS enhancement type of transistor. Each of the transistors 170e and 170g is a NMOS enhancement type of transistor. For example, the resistors 171 and 172 are set to 5 M Ohms and 200 K Ohms respectively, and thereby an voltage amplification rate of the amplifier 170 is set to 25 times (5 M Ohms/200 K Ohms). The ratio of current mirror of the stage 170c is set in order that a reference current of 200 nA flows into the transistor 170d while a drive current 200 nA and 400 nA flow into the stages 170a and 170b respectively, when power voltage is 3 V.

Figure 4:
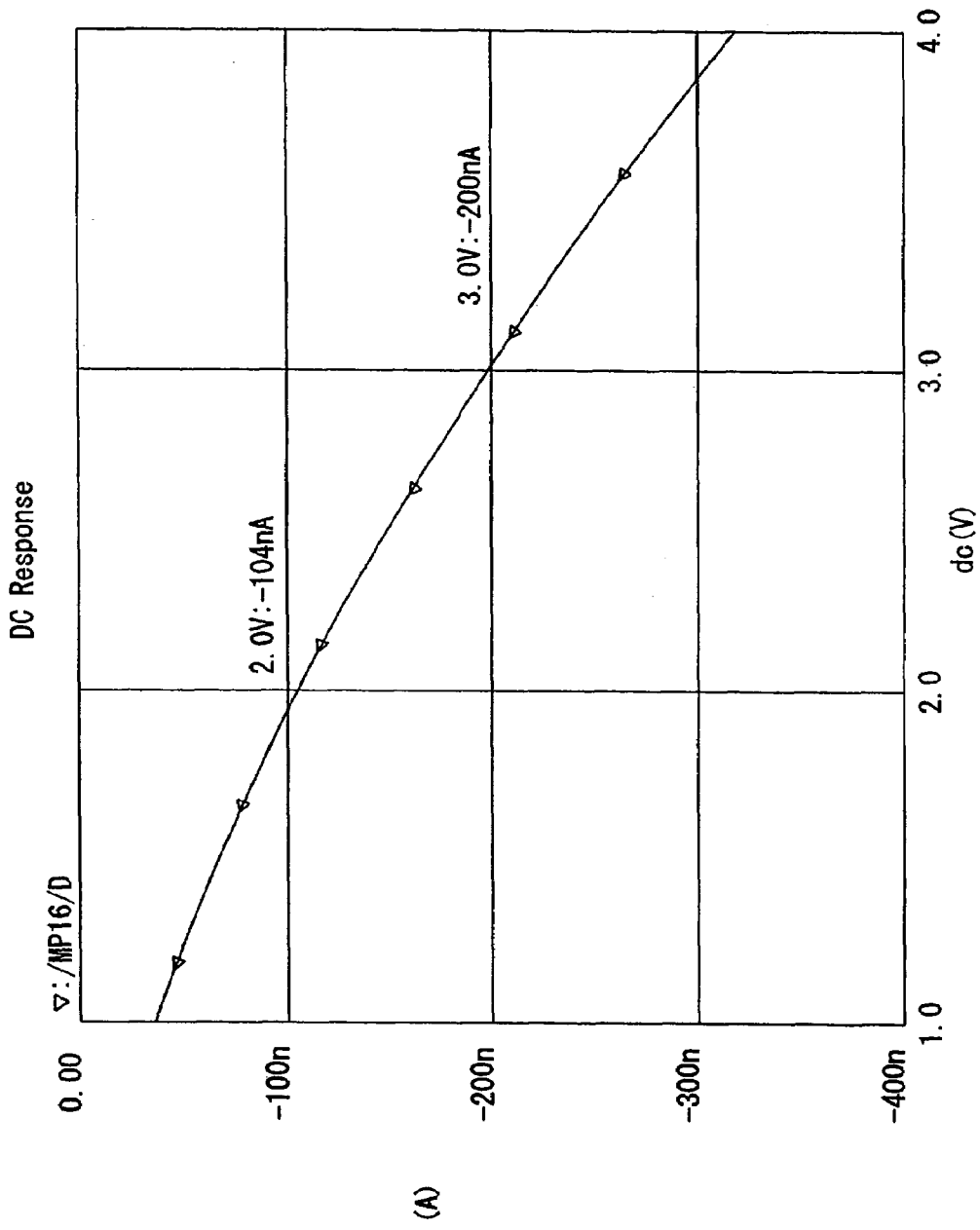
FIG. 4 is a graph of reference current in the operational amplifier versus variation of power voltage.

In this construction, if the power voltage is reduced to 2V due to any cause, the current into the transistor 170d as shown in FIGS. 3 and 4 is reduced to approximately the half (from 200 nA to 100 nA). The output current ability of the amplifier 170 is also reduced to the half (from 400 nA to 200 nA). Therefore, when input signal of the amplifier 170 is greater than the upper end of the output current ability, the amplifier 170 cannot amplify the input signal in accordance with the voltage amplification rate. As a result, the secureness of the additional coverage and the reduction of the current consumption appear to be a contradictory problem.

In order to solve this problem, the circuit 10 as shown in FIG. 1 comprises a current changeover circuit 11, a current generating circuit 12 and a distribution circuit 13. The circuit 10 also supplies a drive current to each of signal circuits comprised of circuits 16-19. This circuit 10 is characterized by independent current mirror circuits which are individually designed for the voltage amplification circuit 17, the detection circuit 18 and the output circuit 19. And these current mirror circuits change the dive current for each of the circuits 17-19.

The current changeover circuit 11 issues changeover signals for changeover of the dive current to the above-mentioned each circuit.

The current generating circuit 12 is comprised of a reference current source 120, a fixed current source 121 and variable current sources 122-124. The circuit 12 generates a fixed current and variable currents. The reference current source 120 generates a reference current. The fixed current source 121 is comprised of a current mirror circuit with a terminal T121. The source 121 provides the distribution circuit 13 through the terminal T121 with the fixed current based on the reference current from the reference current source 120. The variable current sources 122-124 are comprised of current mirror circuits with terminals T122-T124 respectively. Each variable current source provides the distribution circuit 13 through its terminal with the variable current stepped up or down to any of different currents based on the reference current. For example, the different currents are set to one, two, three times of the reference current.

In an example of FIG. 1, the fixed current source 121 is constructed with NMOS transistors 121a and 121b. The transistor 121a is connected between the reference current source 120 and ground. The transistor 121b is connected between the terminal T121 and ground. Gates of these transistors 121a and 121b are also connected each other, while the gates are connected to a drain of the transistor 121a. This source 121 provides to the distribution circuit 13 through the terminal T121 with a current obtained by increasing or decreasing the reference current at a ratio of current mirror. This ratio of current mirror is decided by a ratio (width/length) of transistor sizes of the transistors 121a and 121b.

The variable current source 122 is constructed with NMOS transistors 122b, 122c and 122d and switch elements (e.g., PMOS transistors) 122f and 122g. The NMOS transistor 122b is connected between the terminal T122 and ground, and its gate is connected to the drain and the gate of the NMOS transistor 121a. The NMOS transistor 122c is connected in series with the switch element 122f, while the series combination of the transistor 122c and the element 122f is connected between the terminal T122 and ground. A gate of the transistor 122c is also connected to the drain and the gate of the NMOS transistor 121a. The NMOS transistor 122d is connected in series with the switch element 122g, while the series combination of the transistor 122d and the element 122g is connected between the terminal T122 and ground. A gate of the transistor 122d is also connected to the drain and the gate of the NMOS transistor 121a. Each transistor of this source 122 provides to the distribution circuit 13 through the terminal T122 (and the switch element) with a current obtained by increasing or decreasing the reference current at a ratio of current mirror. This ratio of current mirror is decided by a ratio of transistor sizes of the transistor 121a and itself (122b, 122c or 122d).

The variable current source 123 is constructed with NMOS transistors 123b, 123c and 123d and switch elements 123f and 123g in the same way as the source 122. The variable current source 124 is constructed with NMOS transistors 124b, 124c and 124d and switch elements 124f and 124g in the same way as the source 122.

The distribution circuit 13 is comprised of current mirror circuits 131-134 and distributes the drive current to a part of the signal circuits, for example circuit 16 based on the current from the fixed current source 121. The circuit 13 also distributes the drive current to the remaining part of the signal circuits, for example circuits 17-19 based on the current from the variable current sources 122-124.

In the example of FIG. 1, the circuit 131 is constructed with PMOS transistors 131a and 131b. The transistor 131a is connected between a voltage source and the terminal T121. The transistor 131b is connected between the voltage source and the I/V conversion circuit 16. Gates of these transistors 131a and 131b are also connected each other, while the gates are connected to a drain of the transistor 131a. This circuit 131 obtains the drive current by increasing or decreasing the current from the source 121 at a ratio of current mirror. And the circuit 131 distributes the drive current to the I/V conversion circuit 16. The ratio of current mirror is decided by a ratio of transistor sizes of the transistors 131a and 131b.

The circuit 132 is constructed with PMOS transistors 132a and 132b in the same way as the circuit 131 and distributes the drive current based on the current from the source 122 to the voltage amplification circuit 17. The circuit 133 is constructed with PMOS transistors 133a and 133b in the same way as the circuit 131 and distributes the drive current based on the current from the source 123 to the detection circuit 18. The circuit 134 is constructed with PMOS transistors 134a and 134b in the same way as the circuit 131 and distributes the drive current based on the current from the source 124 to the output circuit 19.

The operation of the infrared detecting device A is now explained. In any of the variable current sources 122-124, when both of the switch elements turn off by the changeover signal from the current changeover circuit 11, for example the current (hereinafter also referred to as the "generated current") equivalent to the reference current is provided to the distribution circuit 13 from the terminal. The distribution circuit 13 then distributes the drive current (e.g., the current equivalent to the reference current) based on the generated current to the corresponding circuit of the circuits 17-19.

In any of the sources 122-124, when one of the switch elements turns on by the changeover signal from the circuit 11, for example the current ("generated current") equivalent to 2× reference current is provided to the circuit 13 from the terminal. The circuit 13 then distributes the drive current (e.g., the current equivalent to 2× reference current) based on the generated current to the corresponding circuit of the circuits 17-19.

In any of the sources 122-124, when both of the switch elements turn on by the changeover signal from the circuit 11, for example the current ("generated current") equivalent to 3× reference current is provided to the circuit 13 from the terminal. The circuit 13 then distributes the drive current (e.g., the current equivalent to 3× reference current) based on the generated current to the corresponding circuit of the circuits 17-19.

On the other hand, the source 121 provides for example the current ("generated current") equivalent to the reference current to the circuit 13 from the terminal T121 regardless of the changeover signal from the circuit 11. The circuit 13 then distributes the drive current (e.g., the current equivalent to the reference current) based on the generated current to the I/V conversion circuit 16. Since the voltage signal of the circuit 16 is amplified by the voltage amplification circuit 17, there is no need to expand the dynamic range of the circuit 16. On the contrary, if the drive current to the circuit 16 was changed over, the voltage signal of the circuit 16 might fluctuate. Therefore, the drive current to the circuit 16 is fixed.

As described above, since the drive current to each of the circuits 17-19 can be individually changed over based on the changeover signal, the drive current can be reduced to low level such as a few μA or 10 s nA. For example, by changing over the drive current to each of the circuits 17-19 based on variation of factor such as power voltage or ambient temperature, the drive current can be appropriately reduced in accordance with the variation. Expanding upon this, in a normal mode when both of the switch elements in each of the sources 122-124 are off state, when the variation causes operation of the circuits to be unstable, by turning the switch elements on one after another based on the variation, the operation can be kept in stable state. As still another example, when a battery is utilized as a power source, since battery voltage will be varied (decreased) as time passed, by turning the switch elements on one after another based on the variation, the operation can be kept in stable state. On the other hand, when a fixed voltage source except the battery is utilized, the operation of the circuit (e.g., the circuit 17) which requires comparatively larger current can be kept in stable state by setting the drive current to the circuit larger. Current consumption in each of the other circuits (e.g., the circuits 18 and 19) can be reduced by setting its drive current lower.

Moreover, since the fixed drive current is distributed to the circuit 16, influence of current changeover in the circuit 16 can be excluded. Therefore the performance or behavior of the circuit 16 can be kept in stable state, while current consumption of the circuits 17-19 can be reduced because the variable drive current is distributed to each of the circuits 17-19.

In an alternate embodiment, the distribution circuit 13 distributes the drive current to the circuits 16 and 19 based on the current from the fixed current source. The circuit 13 also distributes the drive current to the circuits 17 and 18 based on the current from the variable current sources. The circuit 19 comprises a means which is prohibited from issuing the output signal when a pulse width from the circuit 18 is more narrow than a prescribed width. This width is decided by the drive current in order to prevent false detection. If drive current to the circuit 16 was changed over, voltage of the circuit 16 would slightly vary. The voltage with the slight variation is then amplified by the circuit 17 and therefore the performance or behavior of the circuit 16 could be unstable. If drive current to the circuit 19 was changed over, the prescribed width would be changed and therefore output signal of false detection could be issued. For these reasons, it is desirable to fix drive current to each of the circuits 16 and 19.

Figure 5:
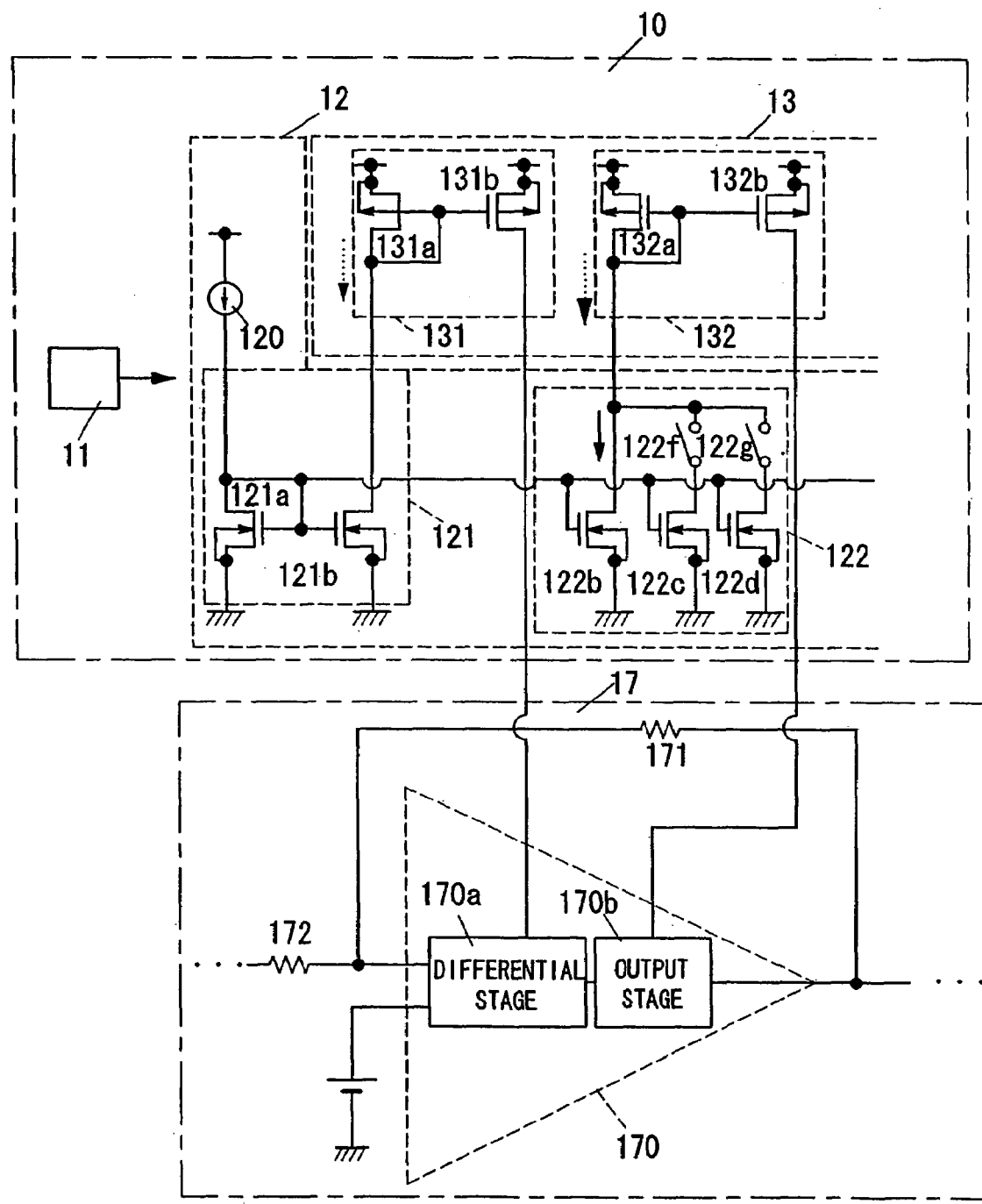
FIG. 5 is an electrical diagram of an alternate embodiment.

In another alternate embodiment, the distribution circuit 13 as shown in FIG. 5 distributes the drive current to the circuits 16 and the differential stage 170a of the circuit 17 based on the current from the fixed current source. The circuit 13 also distributes the drive current to the output stage 170b of the circuit 17 and circuits 18 and 19 based on the current from the variable current sources. Thus, by distributing the fixed dive current to the differential stage 170a, operating point (offset) of the circuit 17 can be kept in stable state. Therefore, current consumption can be reduced while keeping the performance or behavior of the circuit 16 and 17 in stable state in accordance with the above-mentioned variation.

In this alternate embodiment, the drive current to the output stage 170b and circuits 18 and 19 is set to comparatively smaller current in order to save power. Since objective performance cannot be obtained when the drive current to the output stage 170b is reduced due to reduction of power voltage, the performance of the circuit 17 can be preferably maintained by increasing the drive current to the output stage 170b.

Figure 6:
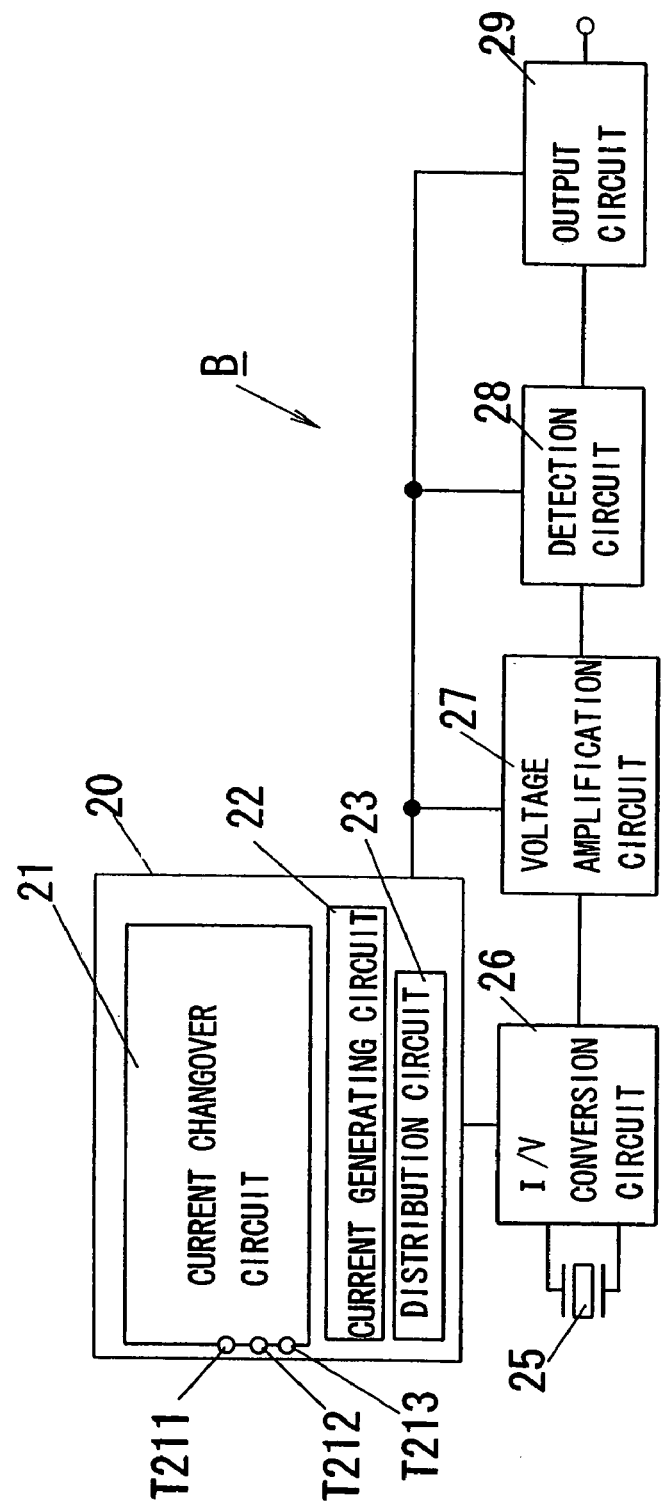
FIG. 6 is an electrical diagram of an infrared detecting device of a second embodiment according to the present invention.

FIG. 6 shows an infrared detecting device B of a second embodiment according to the present invention.

The device B is characterized by a drive power supply circuit 20 compared to the device A being different in that the drive power supply circuit 20 is controlled by external signals.

The circuit 20 comprises a current changeover circuit 21, a current generating circuit 22 and a distribution circuit 23. The circuit 20 also supplies a drive current to each of signal circuits comprised of circuits 26-29.

Figure 7:
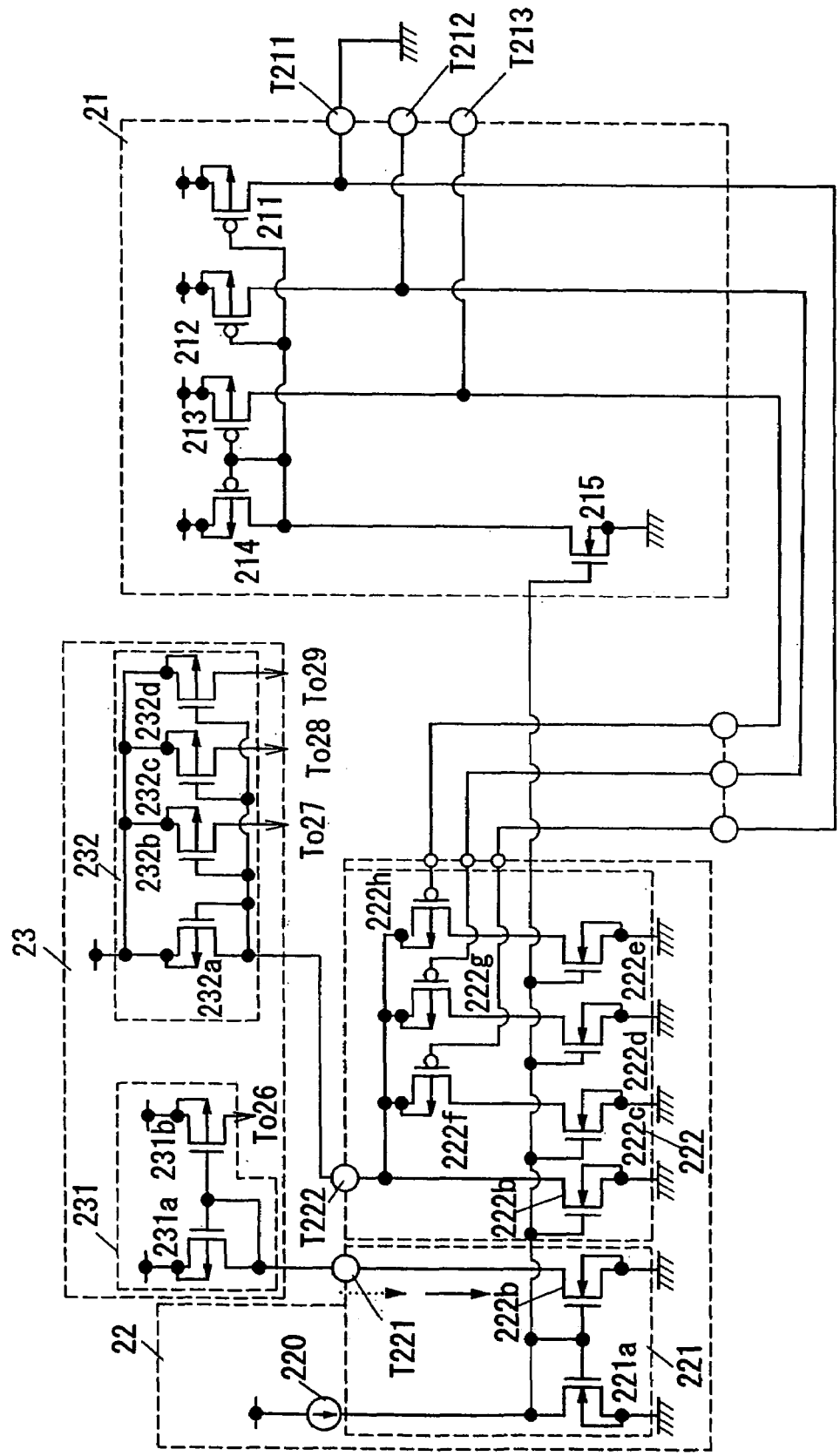
FIG. 7 is an electrical diagram of a current changeover circuit, a current generating circuit and a distribution circuit in the arrangement of FIG. 6.

The current changeover circuit 21 as shown in FIG. 7 is constructed with input terminals T211-T213, PMOS transistors 211-214 and a NMOS transistor 215. The PMOS transistors 211-213 are connected between the voltage source and terminals T211-T213 respectively. Each gate of these transistors 211-213 is connected to gate and drain of the PMOS transistor 214 whose source is connected to the voltage source. The NMOS transistor 215 is connected between the gate and drain of the transistor 214 and ground.

The current generating circuit 22 comprises a common variable current source 222 as a characteristic of the embodiment in addition to comprising a reference current source 220 and a fixed current source 221 in the same way as the circuit 12 of the device A. The variable current source 222 further comprises a NMOS transistor 222e and a switch element (e.g., PMOS transistor) 222h as compared with the variable current source 122. Control terminals (gates) of the elements 222f-222h are connected to the terminals T211-T213 respectively. Gate of the NMOS transistor 215 is connected to the drain and the gate of the NMOS transistor 221a.

The distribution circuit 23 comprises a common current mirror circuit 232 as another characteristic of the embodiment in addition to comprising a current mirror circuit 231 in the same way as the circuit 13 of the device A. The current mirror circuit 232 further comprises a PMOS transistor 232c whose drain is connected to the detection circuit 28 and a PMOS transistor 232d whose drain is connected to the output circuit 29 as compared with the current mirror circuit 132.

The circuit 20 is also set to deliver the minimum drive current to the circuits 27-29 when the terminals T211-T213 are opened. In this case, since each changeover signal to the circuit 222 must be decided, there is a need to pull up or down transistors of the circuit 21. In an example of FIG. 7, each electric potential of the terminals T211-T213 is pulled up by the reference current from the reference current source 220 in order to save power. Especially, in case the device B is mounted into an IC, small-sized devices with multi-voltage (up to eight-way) can be realized by opening or grounding the terminals T211-T213 using technology such as wirebonding.

According to the device B, drive current to the circuits 27-29 can be changed over up to eight-way by providing the external signal of high or low level to each of the terminals T211-T213, and therefore current consumption can be appropriately reduced.

When at least a battery of 1.5 V is utilized as a power source, drive current to the circuits 27-29 can be set so that current consumption is optimized by adjusting the external signals to the terminals T211-T213 based on the number of the batteries.

Figure 8:
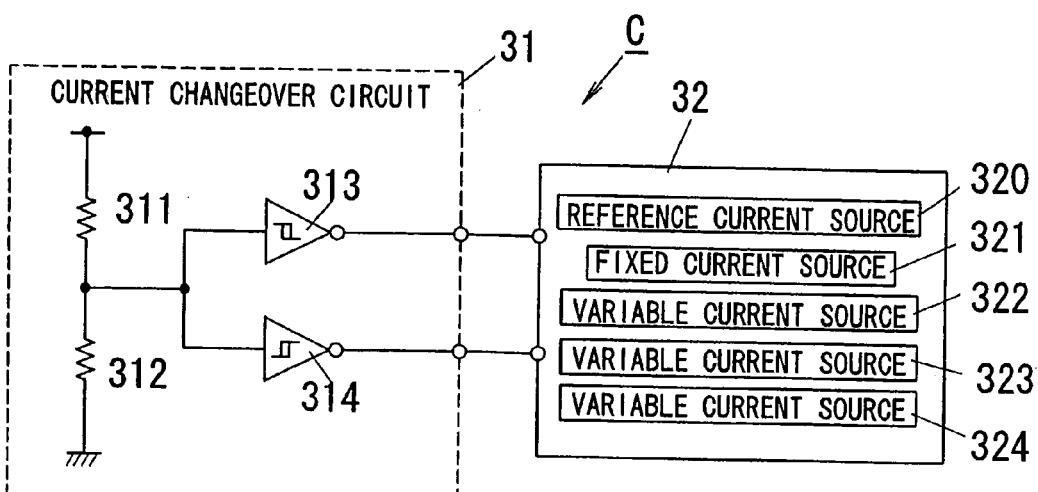
FIG. 8 is an electrical diagram showing a part of an infrared detecting device of a third embodiment according to the present invention.

FIG. 8 shows a part of an infrared detecting device C of a third embodiment according to the present invention.

The device C is characterized by a current changeover circuit 31 which issues changeover signals to variable current sources 322-324 of a current generating circuit 32 based on power voltage.

The current changeover circuit 31 is comprised of resistors 311 and 312 and NOT circuits 313 and 314. The resistors 311 and 312 are for example resistors (e.g., non-doped polysilicon) with high resistance (10 s MOhms) for saving power and detect divided voltage as the power voltage. The NOT circuits 313 and 314 have different thresholds and issue the changeover signals in accordance with the divided voltage. For example, the threshold of the NOT circuit 313 is set to be higher than that of the NOT circuit 314. The NOT circuit 313 provides the changeover signal to one of the switch elements in each of the variable current sources 322-324, while the NOT circuit 314 provides the changeover signal to another of the switch elements in each of the sources 322-324.

The operation of the infrared detecting device C is now explained. When the divided voltage detected by the resistors 311 and 312 is higher than both of the thresholds of the circuits 313 and 314, these circuits provide the changeover signals of Low level to the sources 322-324. Since the switch elements in each of the sources 322-324 then turn off, the drive power supply circuit provides for example the drive current equivalent to the reference current for the voltage amplification circuit, the detection circuit and the output circuit.

When the divided voltage detected by the resistors 311 and 312 is lower than the threshold of the circuit 313 and higher than the threshold of the circuit 314, the circuits 313 and 314 provide the changeover signals of High and Low level to the sources 322-324 respectively. Since the switch elements in each of the sources 322-324 then turn on and off, the drive power supply circuit provides for example the drive current equivalent to 2× reference current for the voltage amplification circuit, the detection circuit and the output circuit.

When the divided voltage detected by the resistors 311 and 312 is lower than both of the thresholds of the circuits 313 and 314, these circuits provide the changeover signals of High level to the sources 322-324. Since the switch elements in each of the sources 322-324 then turn on, the drive power supply circuit provides for example the drive current equivalent to 3× reference current for the voltage amplification circuit, the detection circuit and the output circuit.

Figure 9:
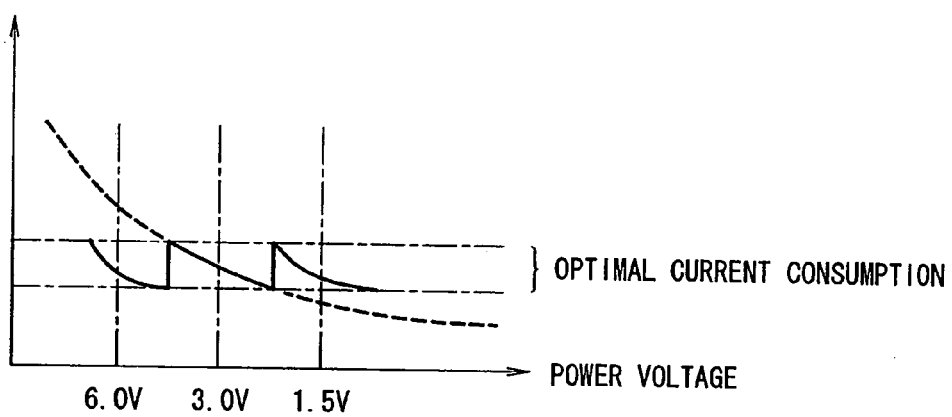
FIG. 9 is a graph of current consumption versus variation of power voltage in the device of FIG. 8.

Therefore, when the drive current to the signal circuits as shown in FIG. 9 is varied (decreased) due to the variation (reduction) of the power voltage, the drive current to each of the voltage amplification circuit, the detection circuit and the output circuit is adjusted (increased) by two-step operation. As a result, the drive current can be converged within a prescribed range of optimal current consumption over a prescribed variation range of the power voltage, and the drive current can be preferably reduced based on the variation of the power voltage.

In an alternate embodiment, the current changeover circuit 31 comprises at least three NOT circuits. The circuit 31 also issues at least four kinds of changeover signals. The current generating circuit and the distribution circuit then provide at least four kinds of drive currents to the voltage amplification circuit, the detection circuit and the output circuit according to the changeover signals from the circuit 31.

Figure 10:
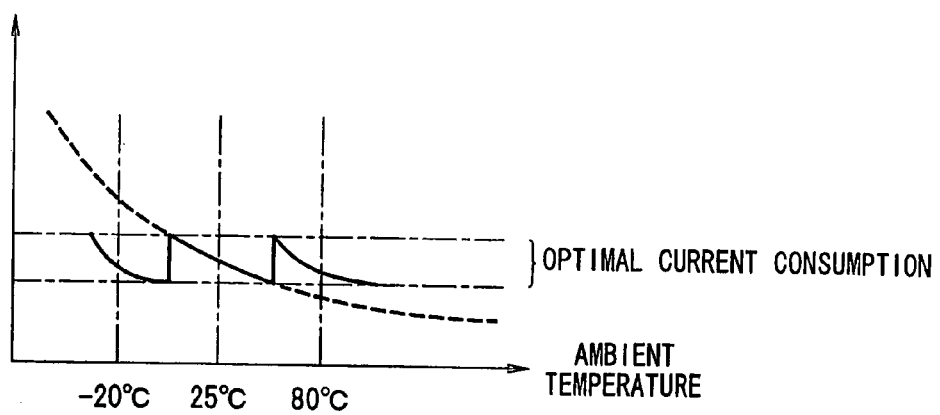
FIG. 10 is a graph of current consumption of an alternate embodiment versus variation of power voltage.

In another alternate embodiment, the current changeover circuit 31 comprises resistors 311 and 312 with different temperature characteristics. In the construction of FIG. 8, a resistor (e.g., non-doped polysilicon) with high resistance and large negative temperature characteristics is used as the resistor 311. In this case, since the divided voltage decreases while the resistance of the resistor 311 becomes high as ambient temperature decreases, the switch elements in each of the sources 322-324 are turn on one after another so as to step the drive current up. Therefore, when the drive current to the signal circuits as shown in FIG. 10 is varied (decreased) due to the variation (increase) of ambient temperature, the drive current to each of the voltage amplification circuit, the detection circuit and the output circuit is adjusted (increased) by two-step operation. As a result, the drive current can be converged within a prescribed range of optimal current consumption over a prescribed variation range of ambient temperature, and the drive current can be preferably reduced based on the variation in ambient temperature.

Figure 11:
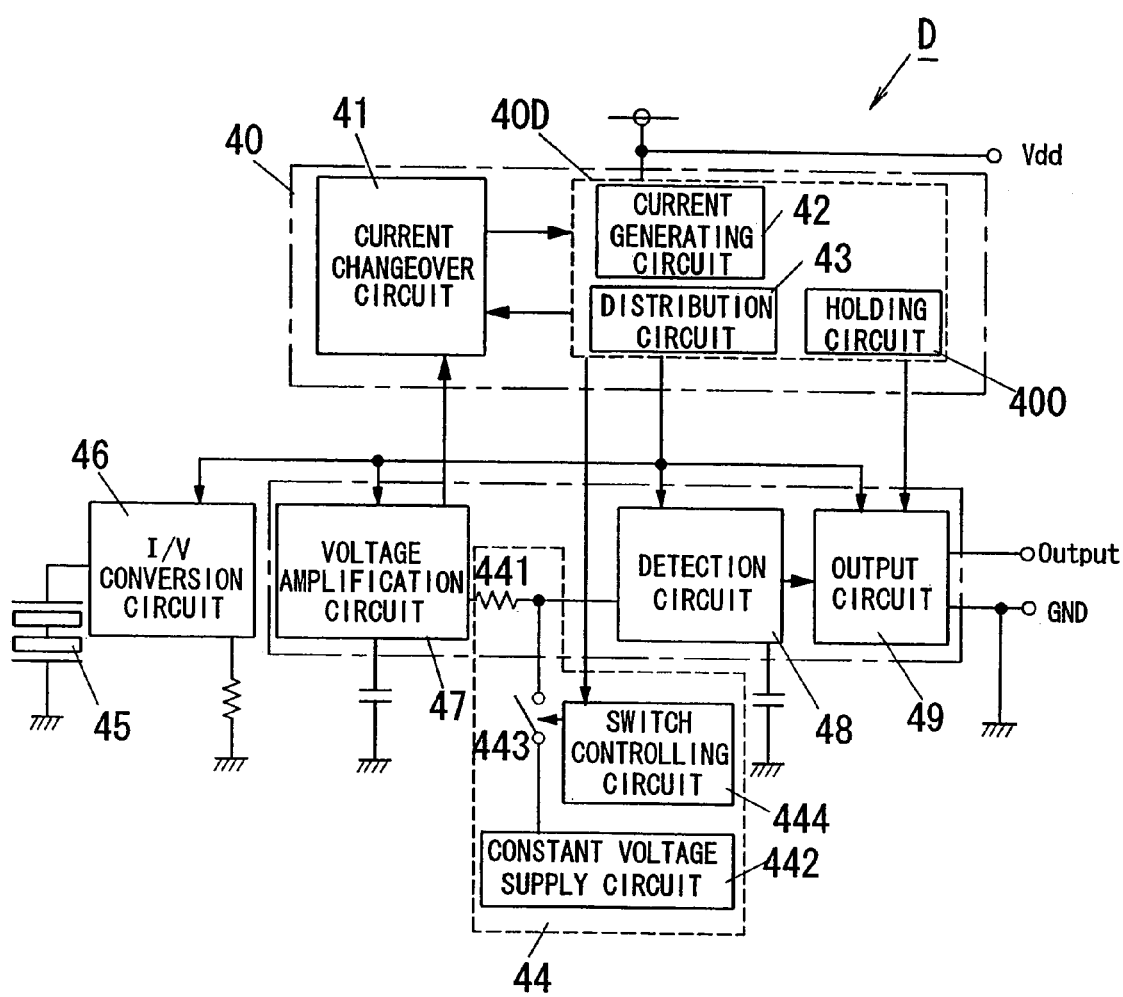
FIG. 11 is an electrical diagram of an infrared detecting device of a fourth embodiment according to the present invention.

FIG. 11 shows an infrared detecting device D of a fourth embodiment according to the present invention.

The device D is characterized by comprising a battery as a power source (not shown in FIG. 11), a mode changeover circuit 40D, a current changeover circuit 41 and a suppression circuit 44 in addition to comprising a pyroelectric element 45, an I/V conversion circuit 46, a voltage amplification circuit 47, a detection circuit 48 and an output circuit 49 in the same way as the device A.

Figure 12:
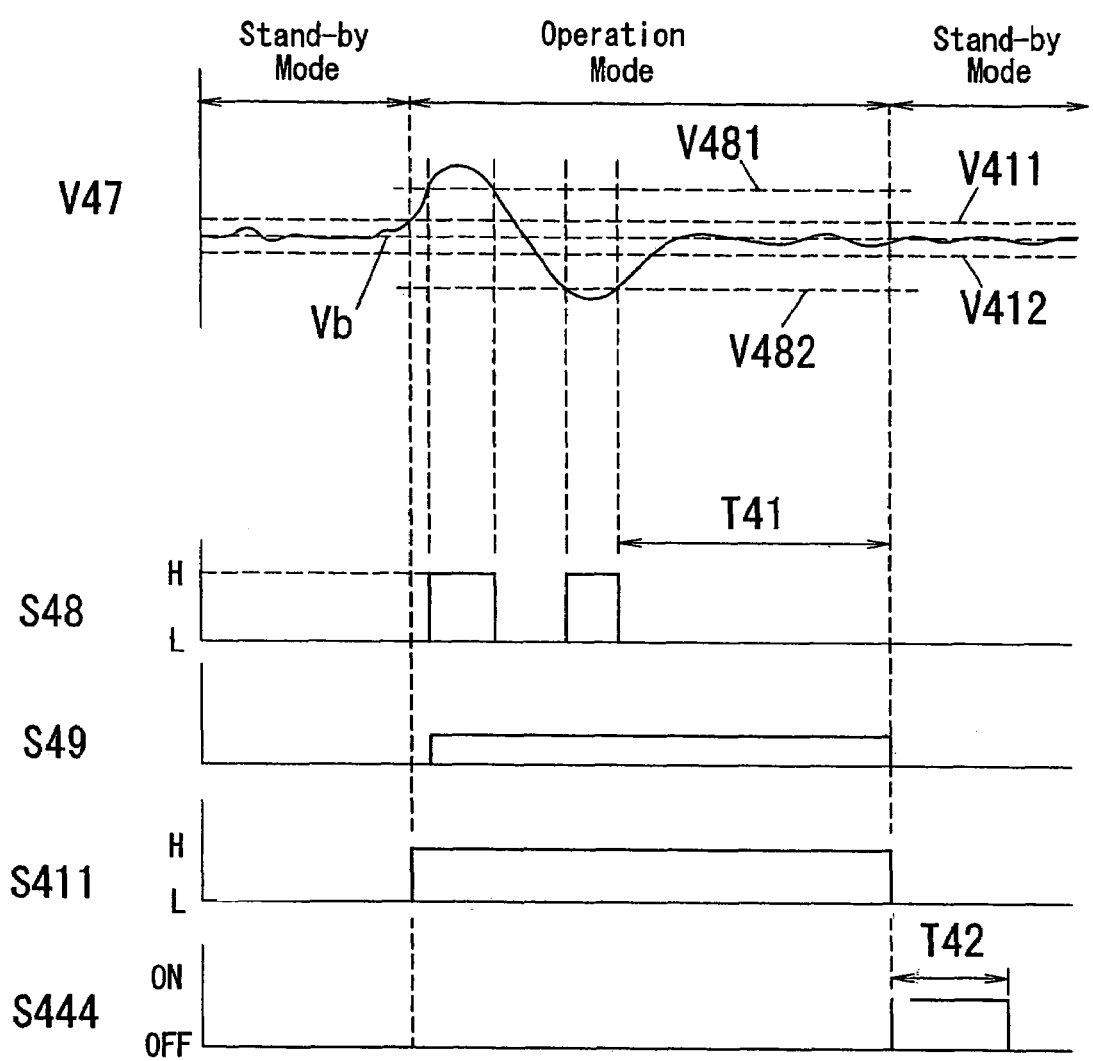
FIG. 12 is a timing diagram showing operation of the device of FIG. 11.

The mode changeover circuit 40D further comprises a holding circuit 400 while comprising a current generating circuit 42 and a distribution circuit 43 in the same way as the device A. The holding circuit 400 as shown in FIG. 12 holds state of output signal S49 of the output circuit 49 for a prescribed time period T41. The state of S49 is held from a point in time (fall time of S48) when components-amplified voltage V47 by the circuit 47 becomes equal to a prescribed detection threshold voltage V481 or V482 of the detection circuit 48 or closer to a reference level ("offset" by bias voltage) Vb than the detection threshold voltage. Hereinafter the period T41 is also referred to as a "holding period" T41

The current changeover circuit 41 provides a changeover signal to one of the switch elements in each variable current source of the current generating circuit 42. The circuit 41 also provides another changeover signal to another of the switch elements. One of these changeover signals is further explained.

The circuit 41 as shown in FIG. 12 provides a first (Low) or second (High) changeover signal as the changeover signal S411 to each variable current source. That is, the circuit 41 issues the first changeover signal from an end point in time of the holding period T41. This signal is issued while the voltage V47 is equal to a prescribed transition threshold voltage V411 or V412 or closer to reference level Vb than the transition threshold voltage. The voltage V411 or V412 is set, to be closer to the reference level Vb than the detection threshold voltage. The circuit 41 also issues the second changeover signal. This signal is issued while the voltage V47 is further from the reference level Vb than the transition threshold voltage. The second changeover signal is also held during the holding period T41.

Therefore the each variable current source steps the variable current down to a current (hereinafter referred to as a "power-saving current") smaller than a rated current of the different currents and keeps the power-saving current while the first changeover signal is issued. On the other hand, the each variable current source steps the variable current up to the rated current and keeps the rated current while the second changeover signal is issued. The each variable current source also steps the variable current up or down according to the another changeover signal (not shown in FIG. 12) different from the signal S411.

The suppression circuit 44 starts suppression of output of any circuit or circuits included in the signal circuits (circuits 46-49) in order to suppress the output signal. The suppression is started from a start point in time on or before which the each variable current source steps down the variable current. The output of the circuit is suppressed so that an output signal which represents non-detection of a human body is issued from the output circuit 49. The circuit 44 as shown in FIG. 12 also releases the suppression after a prescribed time period (hereinafter referred to as a "suppressing period") T42 which includes a point in time on which the variable current is stepped down.

In an example of FIG. 11, the circuit 44 is constructed with a resistor 441, a constant voltage supply circuit 442, a switch (e.g., semiconductor switch element) 443 and a switch controlling circuit 444. The resistor 441 is connected in series between an output end of the voltage amplification circuit 47 and an input end of the detection circuit 48. The constant voltage supply circuit 442 supplies a constant voltage between the resistor 441 and the in put end of the detection circuit 48 through the switch 443. This switch 443 is connected between from an output end of the constant voltage supply circuit 442 to resistor 441 and the input end of the detection circuit 48. The switch 443 also opens or closes a pathway from the circuit 442 to resistor 441 and the circuit 48 in response to OFF or ON signal respectively. The switch controlling circuit 444 as shown in FIG. 12 provides the ON signal as signal S444 to the switch 443 from the above-mentioned start point. The circuit 444 also provides the OFF signal as the signal S444 to the switch 443 after the suppressing period T42. In a words, the circuit 444 starts suppression of an output of the voltage amplification circuit 47 from the start point in time on which the each variable current source steps down the variable current. And the circuit 444 releases the suppression after the suppressing period T42 from the start point.

The operation of the infrared detecting device D is now explained. In operation mode, even if the components-amplified voltage V47 converges to within the window threshold range V481-V482, output signal S49 which represents a detection of a human body is held for the holding period T41. When the voltage V47 then converges to within the window threshold range V411-V412, the first changeover signal is issued at the end point of the holding period T41 from the current changeover circuit 41 while the ON signal S444 is issued from the switch controlling circuit 444. As a result, the drive current is stepped down to the power-saving current and kept to the power-saving current while the output of the voltage amplification circuit 47 is suppressed at the constant voltage of the circuit 442 for the suppressing period T42. After this period T42, the OFF signal S444 is issued from the switch controlling circuit 444. Therefore, the suppression of the output of the circuit 47 is released.

In this stand-by mode, when the voltage V47 becomes less or more than the window threshold range V411-V412, the second changeover signal is issued from the current changeover circuit 41. Therefore, the drive current is stepped up to the rated current and kept to the rated current. When the voltage V47 then becomes less or more than the window threshold range V481-V482, output signal S49 which represents a detection of a human body is issued from the output circuit 49.

Therefore, by setting the suppressing period T42 to a longer time period (e.g., about 1-2 seconds) than that in which the performance or behavior of the circuit 47 becomes unstable it becomes possible to prevent false operation due to variation when the drive current is stepped down.

Figure 13:
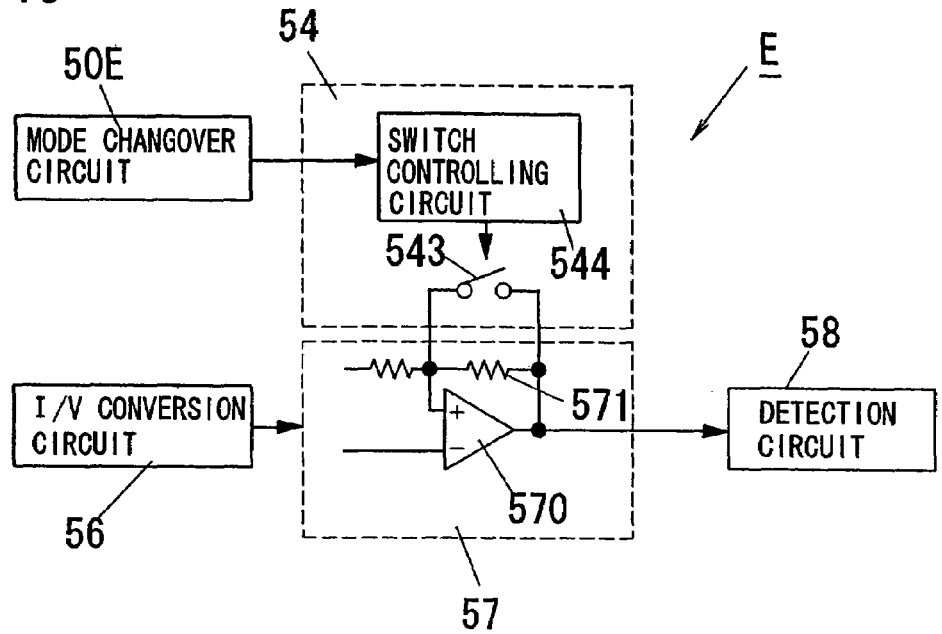
FIG. 13 is an electrical diagram 11; showing a part of an infrared detecting device of a fifth embodiment according to the present invention.

FIG. 13 shows a part of an infrared detecting device E of a fifth embodiment according to the present invention.

The device E is characterized by a suppression circuit 54 and different only in that the suppression circuit 54 is constructed with a switch (e.g., semiconductor switch element) 543 and a switch controlling circuit 544 as compared with the device D.

The switch 543 is connected in parallel with a feedback resistor 571. This resistor 571 is connected between a positive input terminal and an output terminal of an operational amplifier 570 in a voltage amplification circuit 57. The switch 543 also opens or closes its parallel pathway in response to OFF or ON signal respectively.

The switch controlling circuit 544 provides the ON signal to a control terminal of the switch 543 from the above-mentioned start point (ref. On time of S444 in FIG. 12). The circuit 544 also provides the OFF signal to the control terminal of the switch 543 after the above-mentioned suppressing period.

In this device E, an output of the voltage amplification circuit 57 is suppressed at 1× input voltage of the circuit 57 during the suppressing period. Therefore, by setting the suppressing period in the same way as the suppressing period T42 it becomes possible to prevent false operation due to variation when the drive current is stepped down.

Figure 14:
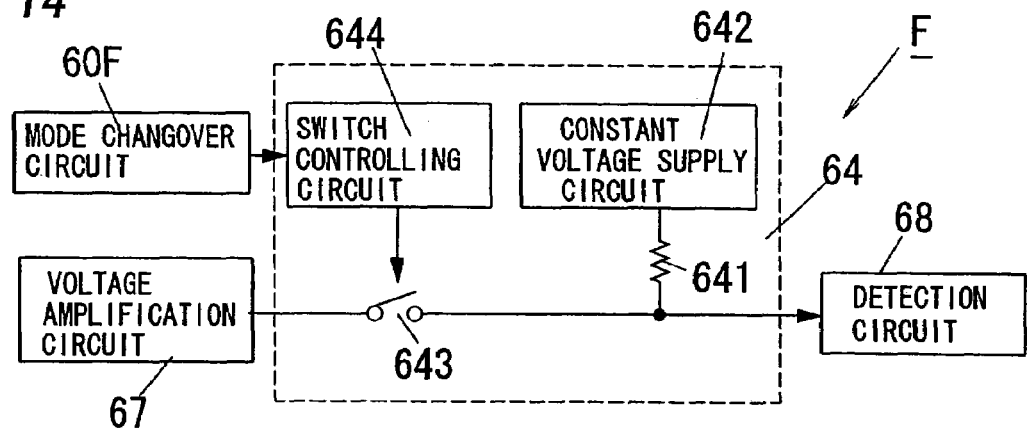
FIG. 14 is an electrical diagram showing a part of an infrared detecting device of a sixth embodiment according to the present invention.

FIG. 14 shows a part of an infrared detecting device F of a sixth embodiment according to the present invention.

The device F is characterized by a suppression circuit 64 which is constructed with a resistor 641, a switch (e.g., semiconductor switch element) 643, a constant voltage supply circuit 642 and a switch controlling circuit 644. As compared with the device D, the circuit 64 has different circuit arrangement and different switch control function.

The resistor 641 prevents influence to an output signal of a voltage amplification circuit 67 when the switch 643 turns on.

The switch 643 is connected between an output end of the voltage amplification circuit 67 and an input end of a detection circuit 68. The switch 643 also opens or closes a pathway from the circuit 67 to the circuit 68 in response to OFF or ON signal respectively.

The constant voltage supply circuit 642 supplies a constant voltage between the switch 643 and the detection circuit 68 through the resistor 641.

Figure 15:
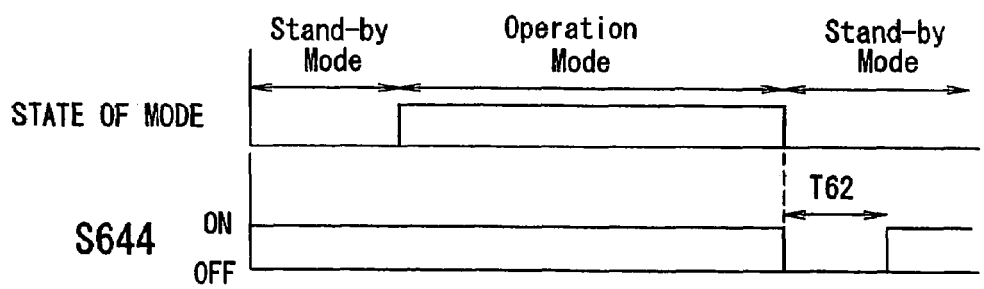
FIG. 15 is a timing diagram showing operation of a suppression circuit of the device of FIG. 14.

The switch controlling circuit 644 as shown in FIG. 15 provides the OFF signal as a signal S644 to a control terminal of the switch 643 from the above-mentioned start point of a suppressing period T62. The circuit 644 also provides the ON signal as the signal S644 to the control terminal of the switch 643 after the suppressing period T62.

In this device F, the pathway from the voltage amplification circuit 67 to the detection circuit 68 is opened during the suppressing period T62. Therefore, by setting the suppressing period T62 in the same way as the suppressing period T42 it becomes possible to prevent false operation due to variation when the drive current is stepped down.

Figure 16:
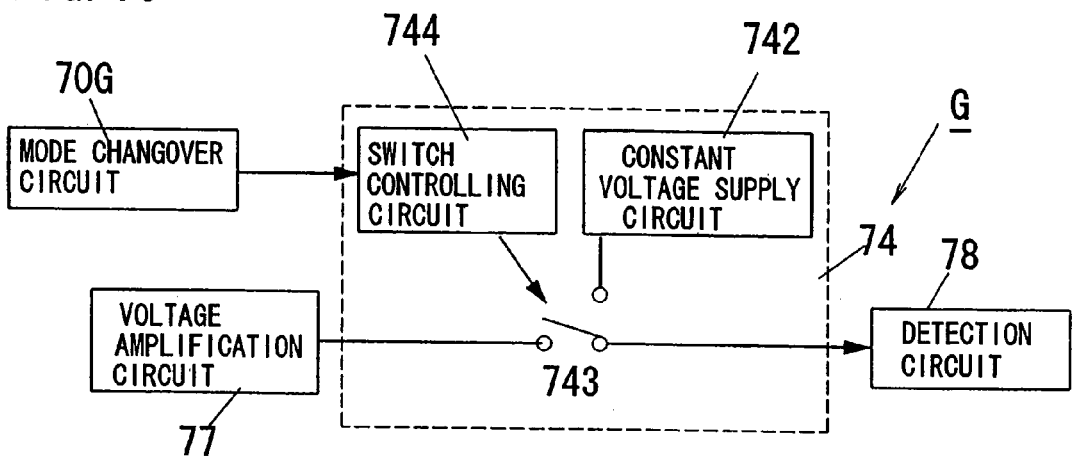
FIG. 16 is an electrical diagram showing a part of an infrared detecting device of a seventh embodiment according to the present invention.

FIG. 16 shows a part of an infrared detecting device G of a seventh embodiment according to the present invention.

The device G is characterized by a suppression circuit 74 and different only in that the suppression circuit 74 is constructed with a constant voltage supply circuit 742, a switch (e.g., semiconductor switch element) 743 and a switch controlling circuit 744 as compared with the device D.

The constant voltage supply circuit 742 supplies a constant voltage to an input end of a detection circuit 78 through the switch 743.

The switch 743 is connected between from the constant voltage supply circuit 742 and a voltage amplification circuit 77 to the detection circuit 78. The switch 743 closes or opens a pathway (hereinafter referred to as a "first pathway") between the constant voltage supply circuit 742 and the detection circuit 78 in response to suppression or unsuppression signal respectively. The switch 743 also opens or closes a pathway (hereinafter referred to as a "second pathway") between the voltage amplification circuit 77 and the detection circuit 78 in response to the suppression or the unsuppression signal respectively.

The switch controlling circuit 744 provides the suppression signal to a control terminal of the switch 743 from the above-mentioned start point. The circuit 744 provides the unsuppression signal to the control terminal of the switch 743 after the above-mentioned suppressing period.

In this device G, the first and the second pathways are closed and opened during the suppressing period. Therefore, by setting the suppressing period in the same way as the suppressing period T42 it becomes possible to prevent false operation due to variation when the drive current is stepped down.

Figure 17:
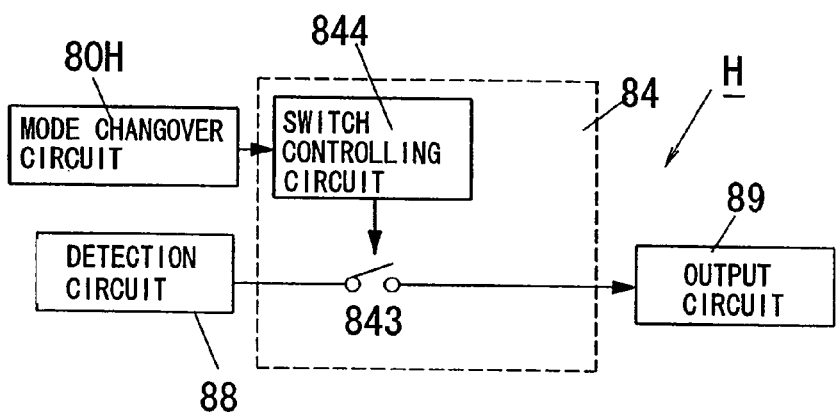
FIG. 17 is an electrical diagram showing a part of an infrared detecting device of a eighth embodiment according to the present invention.

FIG. 17 shows a part of an infrared detecting device H of a eighth embodiment according to the present invention.

The device H is characterized by a suppression circuit 84 and different only in that the suppression circuit 84 is constructed with a switch (e.g., semiconductor switch element) 843 and a switch controlling circuit 844 as compared with the device D.

The switch 843 is connected between an output end of a detection circuit 88 and an input end of an output circuit 89. The switch 843 also opens or closes a pathway between the detection circuit 88 and the output circuit 89 in response to OFF or ON signal respectively.

The switch controlling circuit 844 provides the OFF signal to a control terminal of the switch 843 from the above-mentioned start point. The circuit 844 also provides the ON signal to the control terminal of the switch 843 after the above-mentioned suppressing period.

In this device H, the pathway is opened during the suppressing period. Therefore, by setting the suppressing period in the same way as the suppressing period T42 it becomes possible to prevent false operation due to variation when the drive current is stepped down.

Figure 18:
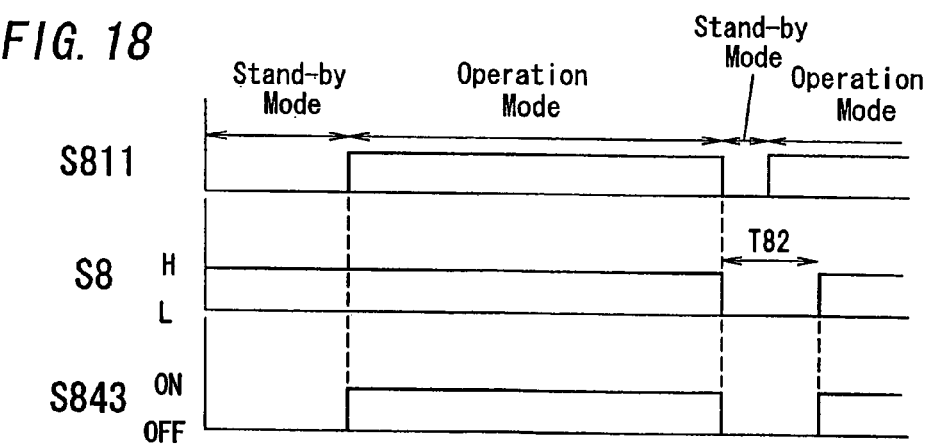
FIG. 18 is a timing diagram showing operation of an alternate embodiment.

In an alternate embodiment, the switch controlling circuit 844 as shown in FIG. 18 generates a signal S8. This signal S8 becomes Low during suppressing period T82 and becomes High during the other time period. The circuit 844 then generates a signal S843 by logicaland of the signal S8 and a changeover signal S811 equivalent to the S411 in the FIG. 12. The circuit 844 then provides the signal S843 to the control terminal of switch 843.

Figure 19:
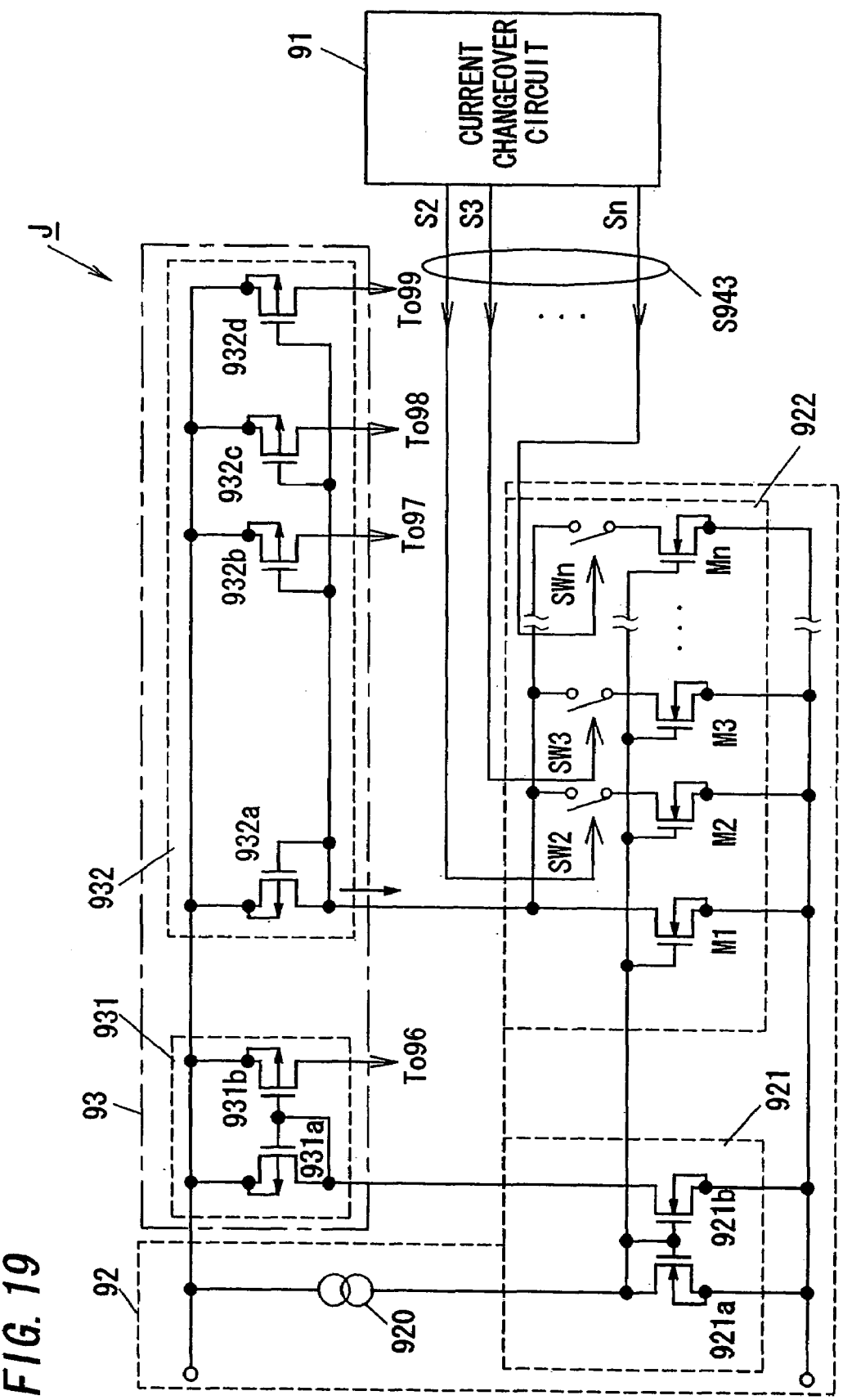
FIG. 19 is an electrical diagram showing a part of an infrared detecting device of a ninth embodiment according to the present invention.

FIG. 19 shows a part of an infrared detecting device J of a ninth embodiment according to the present invention.

The device J is characterized by a common variable current source 922 of a current generating circuit 92 and a current changeover circuit 91 and different in that the current changeover circuit 91 has different switch control function as compared with the device D.

The current generating circuit 92 comprises the above-mentioned common variable current source 922 in addition to a reference current source 920 and a fixed current source 921 with NMOS transistors 921a and 921b. The common variable current source 922 is constructed with NMOS transistors Ml-Mn and switch elements (e.g., semiconductor switch element) SW2-SWn. The source 922 also provides variable current to a current mirror circuit 932 which is included in a distribution circuit 93 and constructed with PMOS transistors 932a-932d in the same way as FIG. 7.

The current changeover circuit 91 provides a signals S943 as the above-mentioned first and second changeover signal to each control terminal of the switch elements SW2-SWn. The signals S943 includes signals S2-Sn (e.g., S2-S4) provided to the terminals of the switch elements SW2-SWn (e.g., SW2-SW4) respectively.

Figure 20:
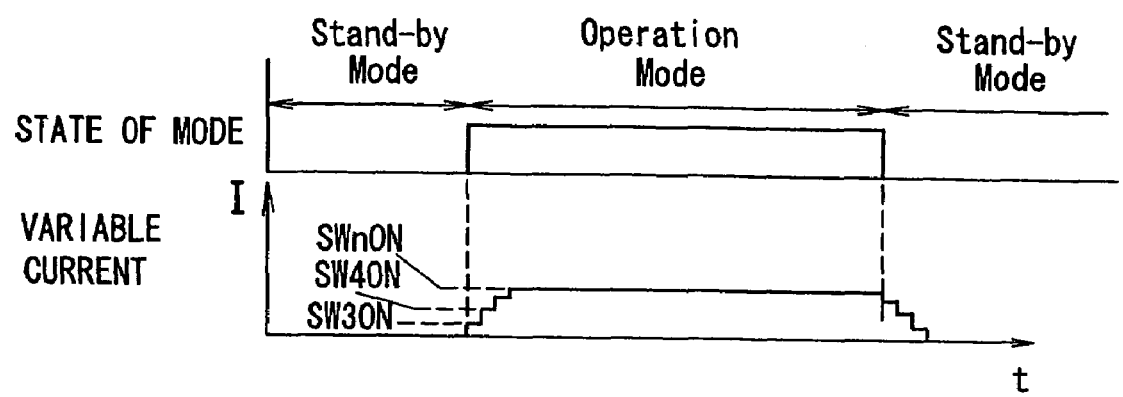
FIG. 20 is a timing diagram showing operation of the device of FIG. 19.

Expanding upon the above, the circuit 91 as shown in FIG. 20 issues the second changeover signals (sequential ON signals) S943 so that the variable current source 922 increases variable current to the biggest rated current while stepping up from smallest current of the different currents according to the second changeover signals. The circuit 91 also issues the first changeover signals (sequential OFF signals) S943 so that the variable current source 922 decreases variable current to the smallest current while stepping down from the rated current of the different currents according to the first changeover signals.

In this device J, the variable current is increased or decreased by sequential step up or down (discrete up or down) operation which can reduce variation. Therefore, it becomes possible to preferably prevent false operation due to variation when the drive current is increased or decreased.

Although the present invention has been described with reference to certain preferred embodiments, numerous modifications and variations can be made by those skilled in the art without departing from the true spirit and scope of this invention.

For example, it should be appreciated that the suppression circuit may start suppression of an output of a circuit included in the signal circuits from a start point in time on or before which the each variable current source steps "up" the variable current. In this case, the output of the circuit is suppressed so that an output signal which represents "non-detection" of a human body is issued from the output circuit.

The invention claimed is:

1. An infrared detecting device, comprising:
    a pyroelectric element which generates a current signal based on incoming infrared radiation;
    an I/V conversion circuit which converts said current signal into a voltage signal;
    a voltage amplification circuit which selectively amplifies components with prescribed frequencies of said voltage signal to issue a components-amplified voltage;
    a detection circuit which provides a comparison between the components-amplified voltage and a prescribed detection threshold voltage to issue a detection signal of the infrared radiation;
    an output circuit which issues an output signal based on the detection signal; and
    a drive power supply circuit which supplies a drive current to each of signal circuits comprised of the I/V conversion circuit, the voltage amplification circuit, the detection circuit and the output circuit;
    wherein said drive power supply circuit is comprised of:
    a current generating circuit which includes a reference current source, a fixed current source and a variable current source, said reference current source being configured to generate a reference current, said fixed current source being configured to provide a fixed current based on said reference current, said variable current source being configured to provide a variable current varying with said reference current; and
    a distribution circuit configured to distribute the drive current to a part of said signal circuits based on the current from said fixed current source, said distribution circuit being configured to distribute the drive current to the remaining part of said signal circuits based on the current from said variable current source;
    the part of said signal circuits including at least said I/V conversion circuit.

2. The infrared detecting device of claim 1, wherein said drive power supply circuit comprises a plurality of the variable current source, each of said variable current sources being individually connected to each circuit of said remaining part of the signal circuits.

3. The infrared detecting device of claim 2, wherein each of the plurality of variable current sources is independently configurable to step the provided variable current up or down to any of prescribed different currents.

4. The infrared detecting device of claim 1, wherein:
said drive power supply circuit comprises at least a terminal for receiving a changeover signal; and
said variable current source steps the variable current up or down to any of prescribed different currents in accordance with the changeover signal received at said terminal.

5. The infrared detecting device of claim 1, wherein said variable current source steps the variable current up or down to any of prescribed different currents based on variation of power voltage.

6. The infrared detecting device of claim 1, wherein said variable current source steps the variable current up or down to any of prescribed different currents based on variation in ambient temperature.

7. The infrared detecting device of claim 1, wherein:
the voltage amplification circuit comprises a differential stage and an output stage; and
the distribution circuit distributes the drive current to the differential stage or the output stage based on the current from said variable current source, or distributes same or different current as the drive current to the differential stage and the output stage based on the current from said variable current source.

8. The infrared detecting device of claim 1, further comprising:
a main power supply for providing power to the circuits, wherein said variable current source steps the variable current up or down to any of prescribed different currents based on variations of the main power supply.

9. The infrared detecting device of claim 1, wherein said variable current source steps the variable current up or down to any of prescribed different currents to compensate for effects that variation in ambient temperature would have on the functioning of at least one of said I/V conversion circuit, said voltage amplification circuit, said detection circuit, or said output circuit.

10. An infrared detecting device, comprising:
a pyroelectric element which generates a current signal based on incoming infrared radiation;
an I/V conversion circuit which converts said current signal into a voltage signal;
a voltage amplification circuit which selectively amplifies components with prescribed frequencies of said voltage signal to issue a components-amplified voltage;
a detection circuit which provides a comparison between the components-amplified voltage and a prescribed detection threshold voltage to issue a detection signal of the infrared radiation;
an output circuit which issues an output signal based on to the detection signal; and
a drive power supply circuit which supplies a drive current to each of signal circuits comprised of the I/V conversion circuit, the voltage amplification circuit, the detection circuit and the output circuit;
wherein said drive power supply circuit is comprised of:
a current generating circuit which includes a reference current source, a fixed current source and a variable current source, said reference current source being configured to generate a reference current, said fixed current source being configured to provide a fixed current based on said reference current, said variable current source being configured to provide a variable current varying with said reference current; and
a distribution circuit configured to distribute the drive current to a part of said signal circuits based on the current from said fixed current source, said distribution circuit being configured to distribute the drive current to the remaining part of said signal circuits based on the current from said variable current source,
further comprising a suppression circuit, wherein:
said drive power supply circuit comprises a current changeover circuit, said current changeover circuit being configured to provide a first changeover signal to said variable current source when said components-amplified voltage is closer to a reference level than a transition threshold voltage, said transition threshold voltage being set to be closer to the reference level than said detection threshold voltage, said current changeover circuit being configured to provide a second changeover signal to said variable current source when said components-amplified voltage is further from the reference level than the transition threshold voltage;
said variable current source configured to step the variable current down to a current smaller than a rated current of prescribed different currents based on said first changeover signal, said variable current source being configured to step the variable current up to the rated current based on said second changeover signal; and
said suppression circuit configured to start suppression of output of any circuit or circuits included in said signal circuits in order to suppress said output signal from a start point in time on or before which said variable current source steps up or down the variable current, said suppression circuit being configured to release the suppression after a prescribed time period.

11. The infrared detecting device of claim 10, wherein said suppression circuit comprises:
a resistor which is connected in series between said voltage amplification circuit and said detection circuit;
a constant voltage supply circuit for supplying a constant voltage between said resistor and said detection circuit;
a switch that is connected between said constant voltage supply circuit and a pathway from said resistor to said detection circuit, said switch being configured to open or close a pathway from said constant voltage supply circuit to said resistor and said detection circuit in response to OFF or ON signal respectively; and
a switch controlling circuit configured to provide the ON signal to said switch from said start point, said switch controlling circuit being configured to provide the OFF signal to said switch after said time period.

12. The infrared detecting device of claim 11 wherein said switch controlling circuit issues:
said second changeover signal so that said variable current source increases the variable current to the biggest rated current while stepping up from smallest current of the different currents according to the second changeover signal; and
said first changeover signal so that said variable current source decreases the variable current to the smallest current while stepping down from the rated current of the different currents according to the first changeover signal.

13. The infrared detecting device of claim 10, wherein:
said voltage amplification circuit comprises an operational amplifier and a feedback resistor, said operational amplifier having a positive input terminal, a negative input terminal and an output terminal, said feedback resistor being connected between said output terminal and one of said input terminals; and said suppression circuit comprises a switch and a switch controlling circuit, said switch being connected in parallel with said feedback resistor, said switch being configured to open or close its parallel pathway in response to OFF or ON signal respectively, said switch controlling circuit being configured to provide the ON signal to said switch from said start point, said switch controlling circuit being configured to provide the OFF signal to said switch after said time period.

14. The infrared detecting device of claim 10, wherein said suppression circuit comprises:

a resistor;

a switch that is connected between said voltage amplification circuit and said detection circuit, said switch being configured to open or close a pathway from said voltage amplification circuit to said detection circuit in response to OFF or ON signal respectively;

a constant voltage supply circuit which supplies a constant voltage between said switch and said detection circuit through said resistor; and a switch controlling circuit configured to provide the OFF signal to said switch from said start point, said switch controlling circuit being configured to provide the ON signal to said switch after said time period.

15. The infrared detecting device of claim 10, wherein said suppression circuit comprises:

a constant voltage supply circuit for supplying a constant voltage to said detection circuit;

a switch that exists at a junction connecting said constant voltage supply circuit, said voltage amplification circuit, and said detection circuit, said switch being configured to close or open a pathway between said constant voltage supply circuit and said detection circuit in response to suppression or unsuppression signal respectively, said switch being configured to open or close a pathway between said voltage amplification circuit and said detection circuit in response to the suppression or the unsuppression signal respectively; and a switch controlling circuit configured to provide the suppression signal to said switch from said start point, said switch controlling circuit being configured to provide the unsuppression signal to said switch after said time period.

16. The infrared detecting device of claim 10, wherein said suppression circuit comprises:

a switch that is connected between said detection circuit and said output circuit, said switch being configured to open or close a pathway between said detection circuit and said output circuit in response to OFF or ON signal respectively; and a switch controlling circuit configured to provide the OFF signal to said switch from said start point, said switch controlling circuit being configured to provide the ON signal to said switch after said time period.

* * * * *